R. E. EWING.
GLOBE HOLDER FOR INCANDESCENT GAS LAMPS.
APPLICATION FILED JAN. 6, 1916.
1,239,372.
Patented Sept. 4, 1917.
3 SHEETS—SHEET 1.
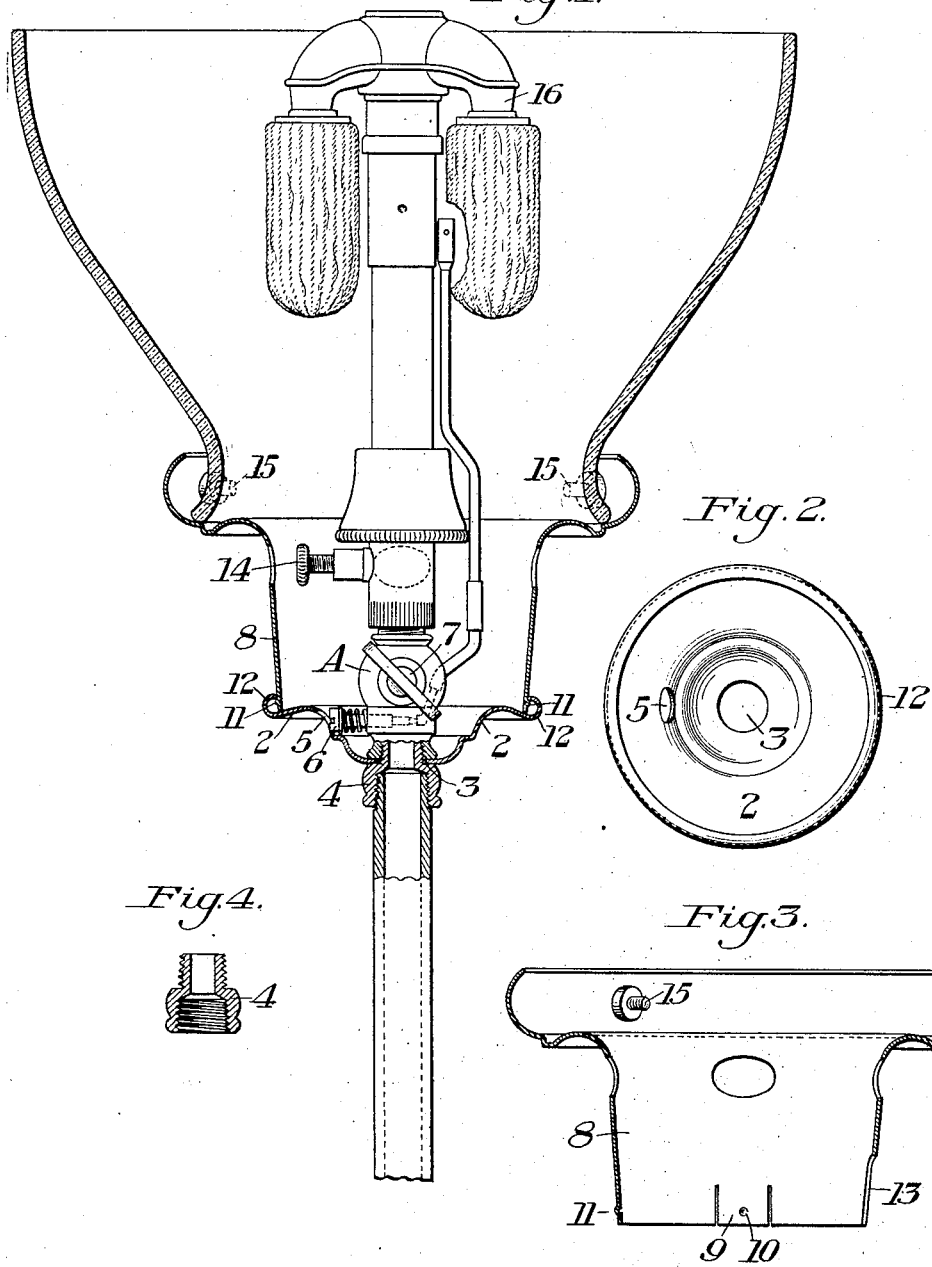
WITNESSES
R A Balderson
Jesse B. Heller
INVENTOR
R. E. Ewing
by Bakewell Byrne Parmelee
his attys

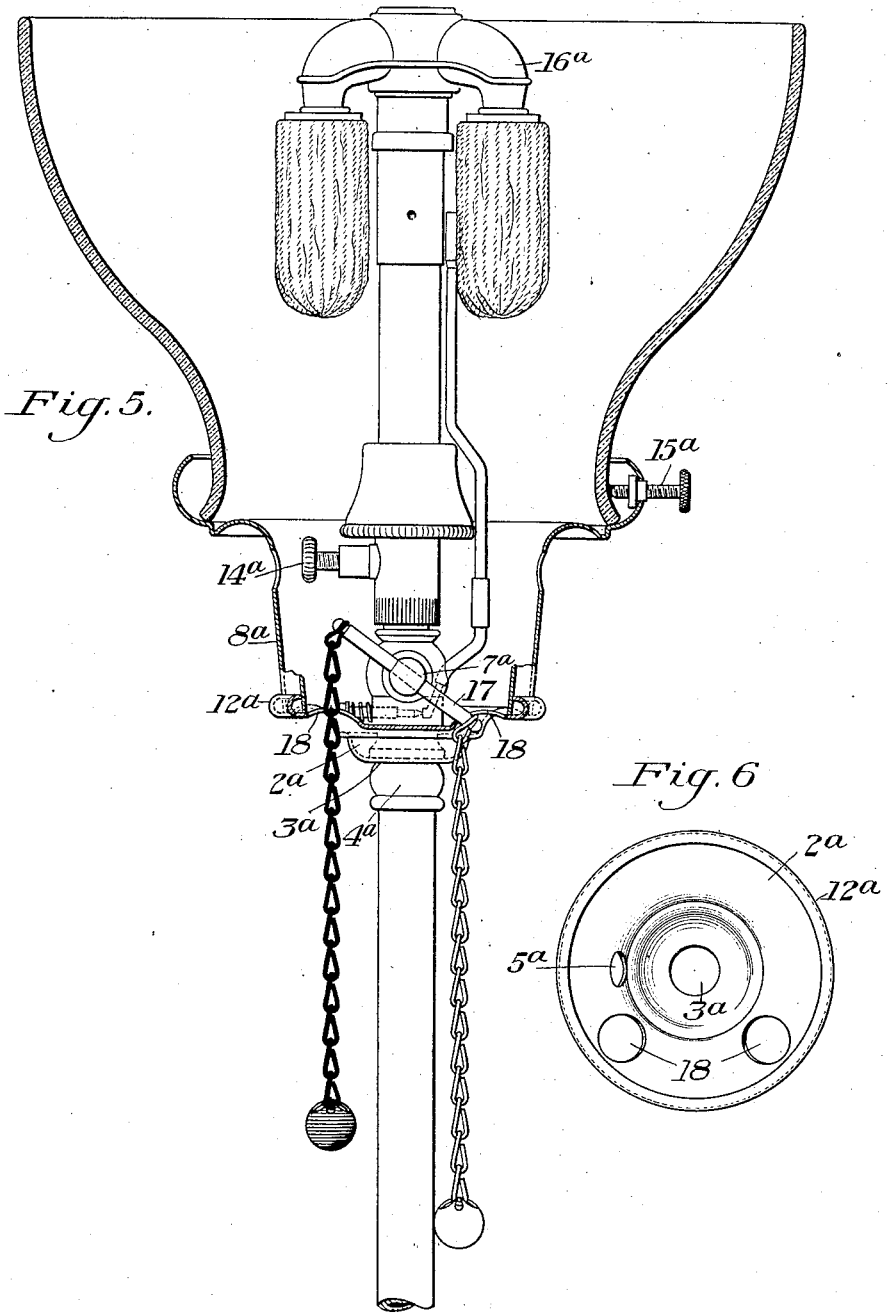

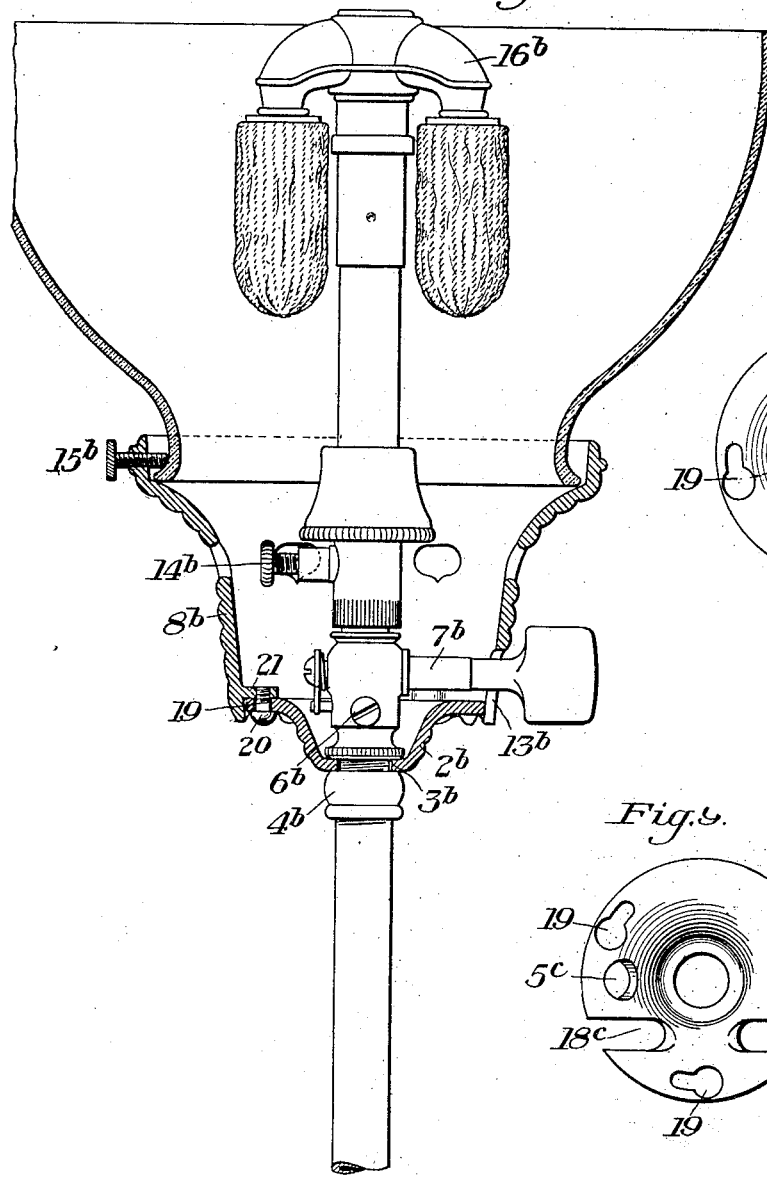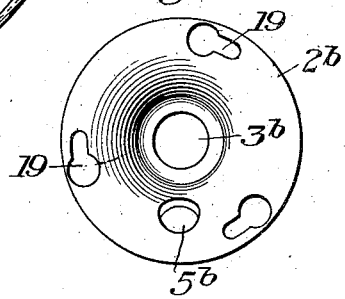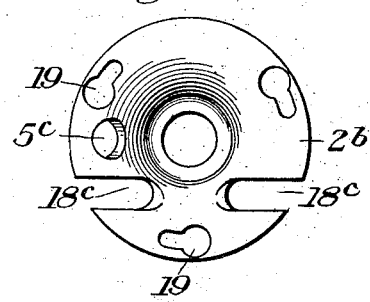

UNITED STATES PATENT OFFICE.

ROBERT E. EWING, OF GLOUCESTER, NEW JERSEY, ASSIGNOR TO WELSBACH LIGHT COMPANY, OF GLOUCESTER, NEW JERSEY, A CORPORATION OF NEW JERSEY.

GLOBE-HOLDER FOR INCANDESCENT GAS-LAMPS.

1,239,372.     Specification of Letters Patent.     Patented Sept. 4, 1917.

Application filed January 6, 1916. Serial No. 70,582.

*To all whom it may concern:*

Be it known that I, ROBERT E. EWING, a citizen of the United States, residing at Gloucester, in the county of Camden and State of New Jersey, have invented a new and useful Improvement in Globe-Holders for Incandescent Gas-Lamps, of which the following is a full, clear, and exact description, reference being had to the accompanying drawings, forming part of this specification, in which—

Figure 1 is a side elevation partly in section of one form of the device;

Fig. 2 is a plan view of the lower part of the husk;

Fig. 3 is a sectional view of the upper part of the husk;

Fig. 4 is a sectional detail view of the shouldered coupling;

Fig. 5 is a view similar to Fig. 1, but showing a modified means for operating the gas valve;

Fig. 6 is a plan view similar to Fig. 2, but showing a modification;

Fig. 7 is a view similar to Figs. 1 and 5, but showing a cast or rigid husk construction;

Fig. 8 is a plan view of the lower section of one form of rigid husk; and

Fig. 9 is a similar view showing a modified form.

Heretofore in incandescent lamps of the inverted type having a plurality of annularly disposed mantles to which my invention relates, the attaching and assembling of the globe holder, lamp and glassware in place on the gas pipe has been a difficult and awkward job.

I have greatly simplified and bettered this type of globe holder by dividing the husk and globe holder into two or more horizontally divided parts, which may be assembled and secured in place on the fixture. In this way, the pliers may be used in attaching the burner where they could not conveniently be used before; and the glassware may be secured in the globe holder forming the upper part of the husk, which may then be attached to the lower part of the husk or shell while in place.

In the drawings, referring to Figs. 1 to 4, in which I show one form of my invention, A represents an ordinary type of valve casing and Bunsen tube assembled for the Welsbach C. E-Z lamp. 2 represents the lower divided portion of the husk or concealing shell, which has the central hole 3 in the deep recessed portion of this shell part, which is clamped against the lower end of the valve casing by a shouldered coupling 4. The lower part of this coupling is internally threaded to be screwed on the fixture, while its upper portion is externally threaded to screw into the casing.

The lower part of the husk or shell is flared upwardly and outwardly, and this rising flared portion has a hole 5 which may be brought into register with the adjusting screw 6 for the pilot tube, thus giving access thereto. This lower part of the husk or shell is preferably located below the projecting stem 7, of the gas valve.

The upper portion 8 of the husk or shell is arranged to detachably interlock or interengage with the lower part, this being accomplished in the form shown by a spring tongue or tongues 9, having a nib 10 in connection with other nibs or projections 11, which allow this upper part to spring into the annular bead portion 12 of the lower part of the husk or shell.

This upper husk portion has a side slot 13, extending upwardly from its lower edge to receive the stem 7 of the gas valve, and is also pierced above this part with openings which are preferably symmetrically located to give a neat appearance, one of these openings giving access to the adjusting screw 14, or other means for adjusting the jet outlet into the Bunsen tube. The upper enlarged portion of this upper part of the shell serves as a globe holder having any globe fastening means, such as the screws 15, shown.

I have shown the Bunsen tube as provided with the three-armed C. E-Z burner head 16 of the Lyon Patent No. 1,158,249, attached for use with the small limp mantles of the Gulbrandsen Patent No. 1,133,470. My invention, however, may be used with other types of single or multiple incandescent gas lamps, whether inverted or upright.

In Figs. 5 and 6, I show another form of the invention, which is similar to the first form shown, except that the means for operating the gas valve extend through the lower separable portion of the husk or shell instead of through the upper portion, as in the first form. In this second form, the parts are similar to those before shown and are marked with similar numerals with the letter "a" applied; but in this case, the valve shaft is provided with a two-armed lever 17, provided with operating chains which hang down through holes 18 in this lower part of the shell. In this case, of course, the upper part of the shell is not slotted to receive the valve handle, but is otherwise similar to that of the first form.

In Figs. 7, 8 and 9, I show another form of the invention particularly adapted for cast or rigid husks or shells. In these forms, the lower part 2^b of the husk takes a slightly changed form, its upper portion being flat and annular and having a series of slotted holes 19. These holes receive screws or headed studs 20, projecting downwardly from inwardly projecting lugs 21, in the upper shell. In this form, the lower part of the shell is clamped in place as before by the coupling, the globe or glassware may be secured in the upper part, and this part is then slipped down over the lower part and the two parts are held together by turning the upper part on the lower part and, if desired, tightening one of the screws. In Figs. 7 and 8, parts similar to the parts heretofore shown are marked with similar numerals with the letter "b" applied.

The other form of this latter type shown in Fig. 9 is substantially the same as this form, except that the valve levers, such as shown in Fig. 5, are provided with chains extending down through slots 18^c in the lower part of the non-elastic husk.

The different parts of the shell or husk may be secured together in other ways than those shown, and other changes may be made, without departing from my invention.

I claim:

1. In a globe holder for incandescent gas lamps of the inverted cluster type, a valve casing having a valve therein, an upwardly extending Bunsen tube supported on the casing, an adjusting screw extending laterally from the valve casing above the valve for adjusting the jet outlet to the Bunsen tube, a burner head removably supported on the Bunsen tube, a globe supporting husk having a plurality of members, the lower member being secured to the valve casing and having a seat for the upper member, the upper member being supported on said seat, said husk inclosing the adjusting screw and the valve casing and having an opening therethrough for giving access to the adjusting screw, and means on the upper husk member for supporting a globe; substantially as described.

2. In a globe holder for incandescent gas lamps of the inverted cluster type, a valve casing having a valve therein, an upwardly extending Bunsen tube supported on the casing, an adjusting screw extending laterally from the valve casing above the valve for adjusting the jet outlet to the Bunsen tube, a burner head removably supported on the Bunsen tube, a globe supporting husk having a plurality of members, the lower member being secured to the valve casing and having a seat for the upper member, the upper member being supported on said seat, said husk inclosing the adjusting screw and the valve casing and having an opening therethrough for giving access to the adjusting screw, the lower member having a plurality of openings therethrough, and valve actuating chains connected to the valve stem and extending through said openings; substantially as described.

3. In a globe holder for incandescent gas lamps of the inverted type, a valve casing having a valve therein, an upwardly extending Bunsen tube supported on the casing, an adjusting screw extending laterally from the valve casing above the valve for adjusting the jet outlet to the Bunsen tube, a burner head removably supported on the Bunsen tube, a pilot light tube connected to the valve casing below the valve and extending upwardly therefrom, a pilot light adjustment, a valve supporting husk having a plurality of members, the lower member being below the valve casing, means for securing the lower member to the gas pipe, the lower member having a seat for the upper member, the upper member being supported on said seat, said husk inclosing the adjusting screw, valve casing, pilot light and pilot light adjusting screw, there being openings through the husk member for giving access to the adjusting screw and the pilot light adjustment, and means on the upper husk member for supporting a globe; substantially as described.

In testimony whereof, I have hereunto set my hand.

ROBERT E. EWING.

Witnesses:
J. H. JOHNSON,
A. M. RITCHIE.